(12) United States Patent
Henry et al.

(10) Patent No.: US 6,373,211 B1
(45) Date of Patent: Apr. 16, 2002

(54) EXTENDED SPEED RANGE OPERATION OF PERMANENT MAGNET BRUSHLESS MACHINES USING OPTIMAL PHASE ANGLE CONTROL IN THE VOLTAGE MODE OPERATION

(75) Inventors: Rassem Ragheb Henry, Clinton Township; Thomas Wolfgang Nehl, Shelby Township; Nady Boules; Malakondaiah Naidu, both of Troy, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/664,178

(22) Filed: Sep. 18, 2000

Related U.S. Application Data

(60) Provisional application No. 60/154,613, filed on Sep. 17, 1999, provisional application No. 60/154,681, filed on Sep. 17, 1999, and provisional application No. 60/183,301, filed on Feb. 17, 2000.

(51) Int. Cl.$^7$ .............................. H02P 7/01; B62D 5/04
(52) U.S. Cl. ...................... 318/432; 318/434; 318/439; 180/443; 180/446
(58) Field of Search ................................ 318/430–439, 318/139, 280–293; 180/248, 249, 443, 446, 79.1; 701/74, 89; 364/424, 51; 74/388 PS

(56) References Cited

U.S. PATENT DOCUMENTS

| | | | |
|---|---|---|---|
| 3,898,544 A | 8/1975 | Tanikoshi | 318/254 |
| 3,919,609 A | 11/1975 | Klautschek et al. | 318/227 |
| 4,027,213 A | 5/1977 | de Valroger | 318/138 |
| 4,135,120 A | 1/1979 | Hoshimi et al. | 318/138 |
| 4,217,508 A | 8/1980 | Uzuka | 310/46 |
| 4,240,020 A | 12/1980 | Okuyama et al. | 318/721 |
| 4,392,094 A | 7/1983 | Kuhnlein | 318/254 |
| 4,447,771 A | 5/1984 | Whited | 18/661 |
| 4,511,827 A | 4/1985 | Morinaga et al. | 318/254 |
| 4,556,811 A | 12/1985 | Hendricks | 310/266 |
| 4,558,265 A | 12/1985 | Hayashida et al. | 318/561 |
| 4,633,157 A | 12/1986 | Streater | 318/723 |
| 4,688,655 A | 8/1987 | Shimizu | |
| 4,745,984 A | 5/1988 | Shimizu | |
| 4,814,677 A | 3/1989 | Plunkett | 318/254 |
| 4,835,448 A | 5/1989 | Dishner et al. | 318/254 |
| 4,837,692 A | 6/1989 | Shimizu | |
| 4,868,477 A | 9/1989 | Anderson et al. | 318/696 |
| 4,868,970 A | 9/1989 | Schultz et al. | 29/596 |
| 4,882,524 A | 11/1989 | Lee | 318/254 |
| 4,912,379 A | 3/1990 | Matsuda et al. | 318/254 |
| 4,992,717 A | 2/1991 | Marvin et al. | |
| 5,006,774 A | 4/1991 | Rees | 318/721 |
| 5,040,629 A | 8/1991 | Matsuoka et al. | 180/79.1 |
| 5,063,011 A | 11/1991 | Rutz et al. | 264/126 |
| 5,069,972 A | 12/1991 | Versic | 428/407 |
| 5,076,381 A | 12/1991 | Daido et al. | 180/79.1 |

(List continued on next page.)

FOREIGN PATENT DOCUMENTS

| | | | |
|---|---|---|---|
| JP | 6-311778 | * | 11/1994 |
| JP | 11-98884 | * | 4/1999 |
| JP | 2001-61291 | * | 3/2001 |

*Primary Examiner*—Paul Ip
(74) *Attorney, Agent, or Firm*—Edmund P. Anderson

(57) ABSTRACT

A voltage mode control method and apparatus for extending speed range operation from a sinusoidally excited permanent magnet motor is described. The method includes a determination of a maximum value from a first set of parameters with each parameter having a known maximum value as well as a reading of a second set of parameters. A computation of a first derived angle using the first set of parameters and the second set of parameters is then performed. A computation of amplitude of phase voltage and a second derived angle using the first derived angle follows. A resultant output comprising a set of derived command voltages for controlling a power circuit is created whereby the power circuit can achieve required torque levels with lower currents for power switches.

30 Claims, 9 Drawing Sheets

U.S. PATENT DOCUMENTS

| | | | | |
|---|---|---|---|---|
| 5,122,719 | A | 6/1992 | Bessenyei et al. | 318/629 |
| 5,223,775 | A | 6/1993 | Mongeau | 318/432 |
| 5,239,490 | A | 8/1993 | Masaki et al. | |
| 5,331,245 | A | 7/1994 | Burgbacher et al. | 310/186 |
| 5,349,278 | A | 9/1994 | Wedeen | 318/632 |
| 5,361,210 | A | 11/1994 | Fu | |
| 5,428,285 | A | 6/1995 | Koyama et al. | 318/799 |
| 5,433,541 | A | 7/1995 | Hieda et al. | 400/279 |
| 5,444,341 | A | 8/1995 | Kneifel, II et al. | 318/432 |
| 5,460,235 | A | 10/1995 | Shimizu | 180/79.1 |
| 5,467,275 | A | 11/1995 | Takamoto et al. | 364/426.01 |
| 5,469,215 | A | 11/1995 | Nahiki | 318/432 |
| 5,475,289 | A | 12/1995 | McLaughlin et al. | 318/432 |
| 5,554,913 | A | 9/1996 | Ohsawa | 318/434 |
| 5,568,389 | A | 10/1996 | McLaughlin et al. | 364/424.05 |
| 5,569,994 | A | 10/1996 | Taylor et al. | 318/700 |
| 5,579,188 | A | 11/1996 | Dunfield et al. | 360/99.08 |
| 5,585,708 | A | 12/1996 | Richardson et al. | 318/800 |
| 5,616,999 | A | 4/1997 | Matsumura et al. | 318/632 |
| 5,623,409 | A | 4/1997 | Miller | |
| 5,642,044 | A | 6/1997 | Weber | |
| 5,656,911 | A | 8/1997 | Nakayama et al. | 318/718 |
| 5,668,721 | A | 9/1997 | Chandy | 701/41 |
| 5,672,944 | A | 9/1997 | Gokhale et al. | 318/254 |
| 5,701,065 | A | 12/1997 | Ishizaki | 318/701 |
| 5,777,449 | A | 7/1998 | Schager | 318/459 |
| 5,780,986 | A | 7/1998 | Shelton et al. | 318/432 |
| 5,803,197 | A | 9/1998 | Hara et al. | |
| 5,808,448 | A * | 9/1998 | Naito | |
| 5,811,905 | A | 9/1998 | Tang | 310/179 |
| 5,852,355 | A | 12/1998 | Turner | 318/701 |
| 5,881,836 | A | 3/1999 | Nishimoto et al. | 180/446 |
| 5,898,990 | A | 5/1999 | Henry | 29/598 |
| 5,902,934 | A * | 5/1999 | Sprague et al. | |
| 5,919,241 | A | 7/1999 | Bolourchi et al. | 701/41 |
| 5,920,161 | A | 7/1999 | Obara et al. | 318/139 |
| 5,929,590 | A | 7/1999 | Tang | 318/701 |
| 5,962,999 | A | 10/1999 | Nakamura et al. | 318/432 |
| 5,963,706 | A | 10/1999 | Baik | 388/804 |
| 5,977,740 | A | 11/1999 | McCann | 318/701 |
| 5,984,042 | A | 11/1999 | Nishimoto et al. | 180/446 |
| 5,992,556 | A | 11/1999 | Miller | 180/446 |
| 6,002,226 | A | 12/1999 | Collier-Hallman et al. | 318/439 |
| 6,034,460 | A | 3/2000 | Tajima et al. | |
| 6,034,493 | A | 3/2000 | Boyd et al. | |
| 6,034,494 | A * | 3/2000 | Kitamine et al. | |
| 6,043,624 | A | 3/2000 | Masaki et al. | 318/723 |
| 6,049,182 | A | 4/2000 | Makatani et al. | 318/432 |
| 6,129,172 | A | 10/2000 | Yoshida et al. | 180/446 |
| 6,153,993 | A * | 11/2000 | Oomura et al. | |
| 6,172,498 | B1 * | 1/2001 | Schmidt et al. | |
| 6,191,545 | B1 * | 2/2001 | Kawabata et al. | |
| 6,244,061 | B1 * | 6/2001 | Takagi et al. | |
| 6,252,362 | B1 * | 6/2001 | White et al. | |
| 2001/0004197 | A1 * | 6/2001 | Kawabata et al. | |
| 2001/0005121 | A1 * | 6/2001 | Sakamaki | |

* cited by examiner

EXTENDED SPEED RANGE OPERATION OF PERMANENT MAGNET BRUSHLESS MACHINES USING OPTIMAL PHASE ANGLE CONTROL IN THE VOLTAGE MODE OPERATION

CROSS-REFERENCE TO RELATED APPLICATIONS

This application is based upon, and claims the benefit of, U.S. Provisional Patent Application Nos. 60/154,613, filed Sep. 17, 1999; 60/154,681, filed Sep. 17, 1999; and 60/183,301, filed Feb. 17, 2000, the disclosures of all three of which are incorporated by reference herein in their entirety.

TECHNICAL FIELD

This invention relates to electric machines, and more particularly, to extending speed range operation of an electric machine using voltage mode operation.

BACKGROUND OF THE INVENTION

It is known in the art relating to electric motors that polyphase permanent magnet (PM) brushless motors with a sinusoidal field offer the capability of providing low torque ripple, noise, and vibration in comparison with those with a trapezoidal field. Theoretically, if a motor controller can produce polyphase sinusoidal currents with the same frequency as that of the sinusoidal back-emfs, the torque output of the motor will be a constant, and zero torque ripple can be achieved. However, because of the practical limitations of motor design and controller implementation, there are always deviations from those assumptions of pure sinusoidal back-emf and current waveforms. The deviations will usually result in parasitic torque ripple components at various frequencies and magnitudes. The methods of torque control can influence the level of this parasitic torque ripple.

One method for torque control of a permanent magnet motor with a sinusoidal back-emf is accomplished by controlling the motor phase currents so that its current vector is aligned with the back-emf. This control method is known as the current mode control method. In such a method, the motor torque is proportional to the magnitude of the current. However, the current mode control method has some drawbacks. The current mode control method requires a complex controller for digital implementation. The controller requires two or more A/D channels to digitize the current feedback from current sensors. In a three phase system, it is convenient to transform the three-phase variables into a two dimensional d-q synchronous frame which is attached to the rotor and design the controller in the d-q frame. But, because of the considerable calculations and signal processing involved in performing the d-q transformation, reverse d-q transformation and P-I loop algorithms, a high speed processor such as a digital signal processor (DSP) has to be used to update the controller information every data sampling cycle.

One application for electric machine using voltage mode operation is the electric power steering (EPS), which has been the subject of development by auto manufacturers and suppliers for over a decade because of its fuel economy and ease-of-control advantages compared with the traditional hydraulic power steering (HPS). However, commercialization of EPS systems has been slow and is presently limited to small and midget-class cars because of the cost and performance challenges. Among the most challenging technical issues is the pulsating feel at the steering wheel and the audible noise associated with the type of high performance electric drives needed to meet the steering requirements.

The choice of motor type for an EPS is an important one because it determines the characteristics of the drive and the requirements on the power switching devices, controls, and consequently cost. Leading contenders are the Permanent Magnet (PM) brushless motor, the Permanent Magnet (PM) commutator-type and the switched reluctance (SR) motors, each of the three options has its own inherent advantages and limitations. The PM brushless motor, was chosen based on years of experimenting with commutator-type motors. The large motor size and rotor inertia of commutator-type motors limit their applicability to very small cars with reduced steering assist requirements. Additionally, the potential for brush breakage that may result in a rotor lock necessitates the use of a clutch to disconnect the motor from the drive shaft in case of brush failure. SR drives offer an attractive, robust and low cost option, but suffer from inherent excessive torque pulsation and audible noise, unless special measures are taken to reduce such effects. For column assist applications, the motor is located within the passenger compartment and therefore must meet stringent packaging and audible noise requirements that the present SR motor technology may not satisfy. Therefore, the PM brushless motor with its superior characteristics of low inertia, high efficiency and torque density, compared to commutator motors, appears to have the potential for not only meeting the present requirements but also of future high performance EPS systems of medium and large vehicles.

Despite the relatively low levels of torque ripple and noise of EPS systems using conventional PM brushless motors, they are no match to the smoothness and quietness of HPS with decades-long history of performance refinement efforts. Consumers are reluctant in compromising such features. Therefore, a new torque ripple free (TRF) system is needed which, as the name indicates, would eradicate the sources of torque ripple (under ideal conditions) and reduce the noise level considerably. The near-term goal is to enhance the performance of EPS systems with the long-term objective of increasing acceptability of EPS systems for broader usage.

Several performance and cost issues have stood in the way of broad-based EPS commercialization regardless of the technology used, namely:

1. Steering Feel: The key to the wider use of EPS is the ability to reproduce the smoothness feel of hydraulic steering systems at affordable prices. Pulsating torque produced by motors would be felt at the steering wheel, if not reduced to very low levels.

2. Audible Noise: The EPS audible noise emanates mainly from the motor and gearbox. The gear noise is usually mechanical and attributable to lash caused by manufacturing tolerances. The motor noise is mainly a result of structural vibration excited by torque pulsation and radial magnetic forces in brushless motors and by the commutator/brush assembly in commutator motors.

In order to better appreciate the elements of the new scheme, a more detailed discussion about the torque ripple and noise generation mechanisms with a focus on PM brushless motors is presented in the following sections.

Torque ripple Causes and Remedies

There are two sources for torque ripple in a conventional PM brushless motors, namely (1) cogging or detent torque, and (2) commutation torque.

The cogging torque is attributable to the magnetic interaction between the permanent magnets and the slotted structure of the armature. It exists in both brushless and brush-type machines at all speeds and loads, including no-load. The magnetic attraction force exerted on each individual stator tooth, as the magnet leading edge approaches, produces a positive torque, while the force between the tooth and the trailing edge causes a negative torque. The instantaneous value of the cogging torque varies with rotor position and alternates at a frequency that is proportional to the motor speed and the number of slots. The amplitude of the cogging torque is affected by some design parameters, such as slot opening/slot pitch ratio; magnet strength; and air gap length, while its profile could be altered by varying the pole arc/pole pitch ratio. Careful selection of these parameters can lead to reduced cogging torque, but this approach is limited by practical and performance constraints.

A more common and effective approach is by skewing either the stator teeth or the rotor magnet longitudinally, which provides for a gradual transition as the magnet moves under a stator tooth. Theoretically, a skew amount of one slot pitch should eliminate cogging. However, because of practical factors such as magnetic leakage end effects, skew variation due to tolerances, and eccentricity, some undesirable cogging remains.

Typically, current control with phase advance is used in machines in order to extend the speed range of operation by controlling the angle "α" between the current vector and back emf vector and through some degree of field weakening. Angle α is known as the "power angle" because it affects the resultant electromechanical power. In the above case of phase advance the phase currents (current mode control) are required, and current sensors must be used. The benefit of phase advance, or power angle control (or current mode control), is in reducing inverter power rating (and hence, its cost) because of the lower phase current. The above method of controlling the machine currents based on torque and speed commands, as well as phase currents measurements, is known as the "current mode" of operation. In a "voltage mode" of operation, where the machine is controlled without phase current sensors, mainly for lower cost, phase advance has not been an option. Therefore, it is desirable to find a way to achieve similar results in controlling machine currents without using a current sensor.

SUMMARY OF THE INVENTION

A voltage mode control method and apparatus for extending speed range operation from a sinusoidally excited permanent magnet motor is disclosed. It has the advantage of achieving the required performance at a low cost because of the elimination of phase current sensors as well as reducing inverter switching devices ratings. The method includes a determination of a maximum value from a first set of parameters with each parameter having a known maximum value. As well as a reading of a second set of parameters is included. A computation of a first derived angle using the first set of parameters and the second set of parameters is then performed. A computation of a second derived angle using the first derived angle follows. A resultant output comprising a set of derived command voltages for controlling a power circuit is created whereby the power circuit can achieve lower required torque levels with lower current for power switches.

DESCRIPTION OF THE PREFERRED EMBODIMENT

Figure 2:
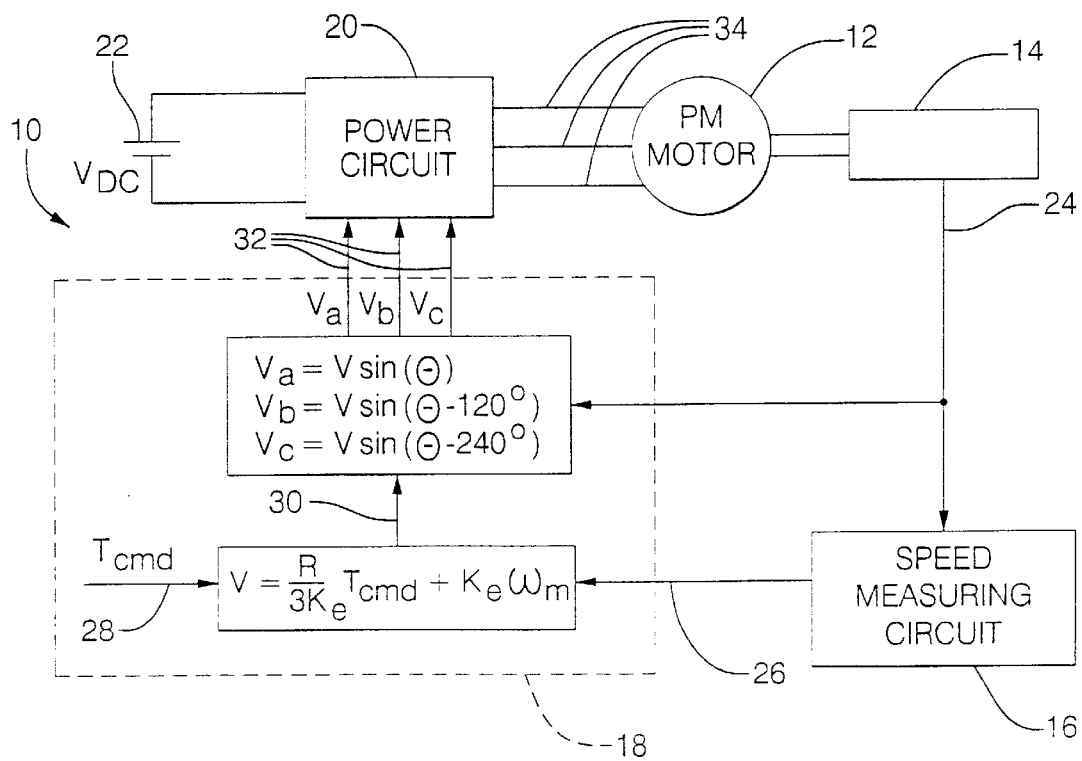
FIG. 2 is a block diagram of a system for controlling the torque of a sinusoidally excited permanent magnet motor.
Figure 3:
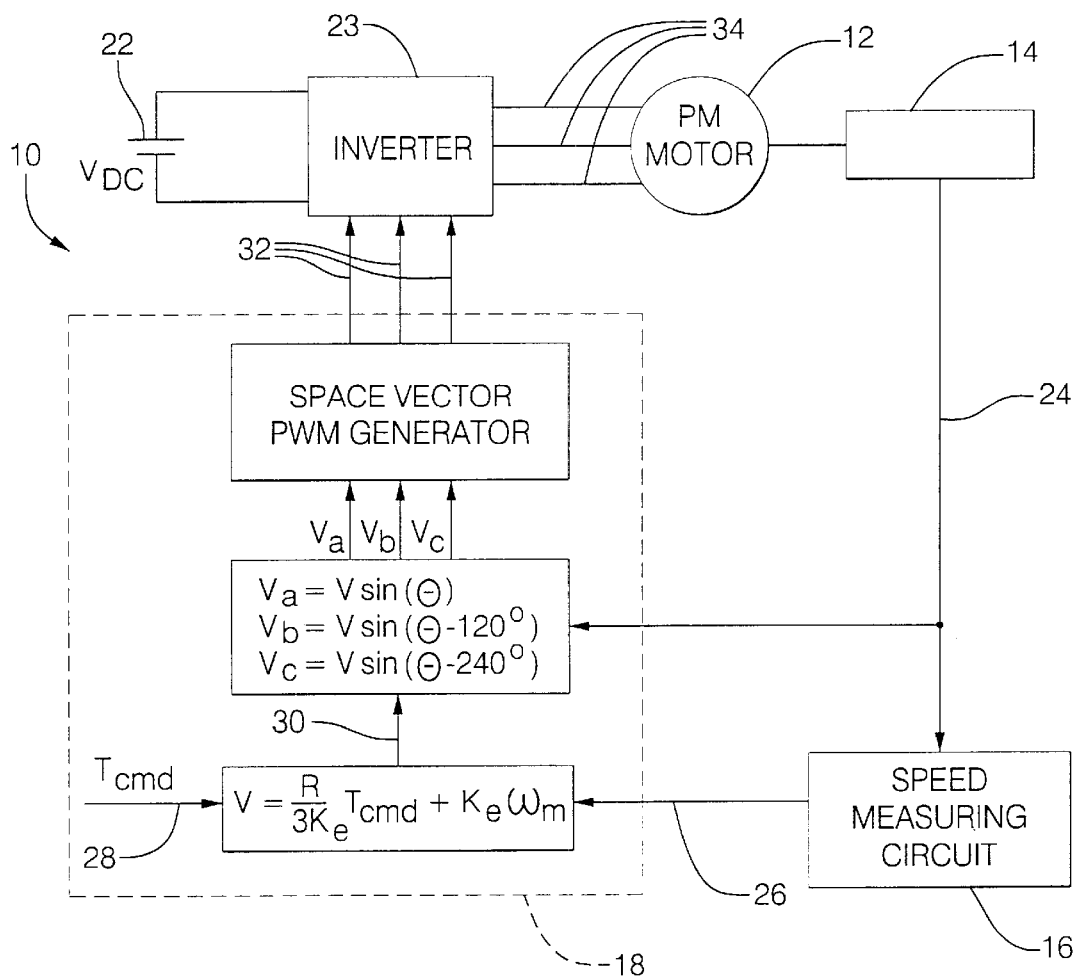
FIG. 3 is a block diagram of a system for controlling the torque of a sinusoidally excited permanent magnet motor.

Referring now to the FIGS. 2 and 3, numeral 10 generally indicates a system for controlling the torque of a sinusoidally excited permanent magnet motor 12. The system includes a rotor position encoder 14, speed measuring circuit 16, controller 18, power circuit 20 and power source 22.

Figure 1:
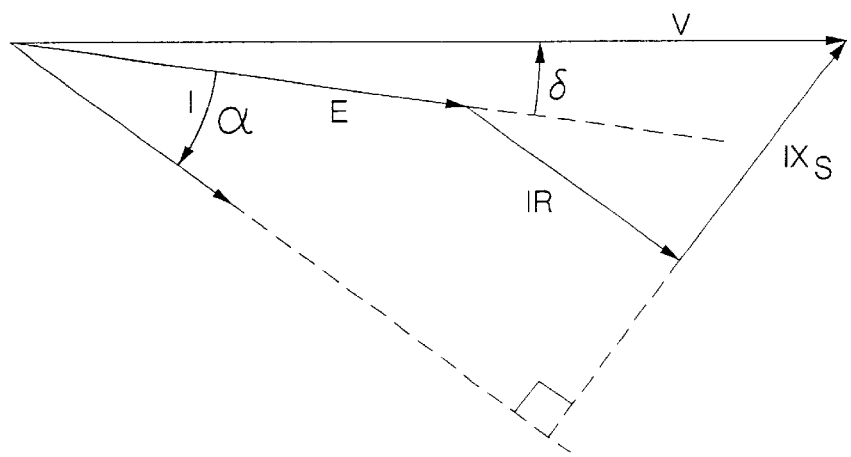
FIG. 1 is a phasor diagram of a permanent magnet motor under constant voltage excitation.

Referring to FIG. 1, there is shown a phasor diagram upon which the voltage-mode control method of the invention is based. The torque of the motor is controlled without using any phase current sensors. By eliminating the use of the current sensors, the controller cost is reduced in addition to the elimination of the parasitic torque ripple caused by the current sensor output drifting with temperature. Instead of controlling the torque producing current, the controller determines the voltage required for producing the desired torque based on motor equations.

Under steady state operating condition, the voltage phasor $\vec{V}$, back-emf phasor $\vec{E}$ and current phasor $\vec{I}$ of a sinusoidally excited PM motor are governed by:

$$\vec{V} = \vec{E} + \vec{I} R + j \vec{I} X_s \qquad (1)$$

where R is the winding resistance, $X_s$ is the phase reactance which is equal to the product of motor inductance $L_s$ and the excitation frequency ω. Here, it is assumed that the angle between back-emf phasor $\vec{E}$ and current phasor $\vec{I}$ is α and the angle between the voltage phasor $\vec{V}$ and the back-emf phasor $\vec{E}$ is δ.

Neglecting motor iron losses, friction and windage losses, the output power of the PM motor is equal to $$P = 3 I E \cos \alpha \qquad (2)$$

and the output torque is $$T = P/\omega_m \qquad (3)$$

where $\omega_m$ ω/(no. of pole pairs). Based on the phasor diagram, it can be derived that $$V \cos \delta = E + I R \cos \alpha + I X_s \sin \alpha \qquad (4)$$

$$V \sin \delta = -I R \sin \alpha + I X_{s \cos \alpha} \qquad (5)$$

Solving equations 4 and 5 yields $$\cos\alpha = \frac{(V\cos\delta - E)R + X_s V \sin\delta}{I(R^2 + X_s^2)} \quad (6)$$

By substituting equation 6 into equation 2, it is obtained that $$P = 3E(V\cos\delta - E)R + \frac{X_s V \sin\delta}{R^2 + X_s^2} \quad (7)$$

From equation 7 and equation 3, the motor torque can be expressed as $$T = 3K_e(V\cos\delta - K_e\omega_m)R + \frac{X_s V \sin\delta}{R^2 + X_s^2} \quad (8)$$

where $K_e = E/\omega_m$ is the EMF constant. It can be seen from equation 8 that the motor torque is dependent on the motor input voltage V, the motor parameters and operating speed. Hence, given the motor parameters and speed, by controlling the voltage magnitude V and its phase angle $\delta$ relative to back-emf, E, it is possible to control the motor torque to a desired value. Thus, the voltage required for any given torque command $T_{cmd}$ can be calculated by substituting $T_{cmd}$ into equation 8 and solving for V:

$$V = \frac{1}{R\cos\delta + X_s\sin\delta}\left(\frac{R^2 + X_s^2}{3K_e}T_{cmd} + ER\right) \quad (9)$$

Equation 9 shows that, for a fixed angle $\delta$ between the back-emf and the terminal voltage, to maintain a torque equal to the commanded torque with varying speed, the amplitude of motor input voltage must change. Thus, information of motor parameters, rotor speed, and position angle is required—but no current feedback is needed—for the controller to develop a signal to produce a desired motor torque.

In the voltage mode control, the angle $\delta$ has to be chosen properly. By referring to FIG. 1, it can be seen that the phase angle $\alpha$ between the current and the back-emf depends on the angle $\delta$. For different phase angles $\alpha$, the motor armature current can induce a magnetic flux either opposed to or aligned with the magnet field. Therefore, the choice of $\delta$ that results in minimal saturation or demagnetization effects on the permanent magnet field is preferred.

Referring to FIG. 3, for the controller 18 to develop the correct voltage needed to produce the desired torque, the position and speed of the rotor are needed. A rotor position encoder 14 is connected to the motor to detect the angular position of the rotor. The encoder 14 may sense the rotary position based on optical detection or magnetic field variations. The encoder 14 outputs a position signal 24 indicating the angular position of the rotor.

From the position signal 24, a speed measuring circuit 16 determines the speed of the rotor and outputs a speed signal 26. The circuit 16 may include a counter that counts the position signal pulses for a predetermined duration. The count value is proportional to the speed of the motor. For example, if a counter counts the position signal pulses in time intervals of 5 ms and the encoder has a resolution of 2.5 degree, the speed measurement will have a resolution of about 41.7 rpm. The speed signal can also be obtained as the derivative of the position signal from the equation $\omega_m \Delta\theta_m/\Delta t$ where $\Delta t$ is the sampling time and $\Delta\theta_m$ is the change in position during the sampling interval.

The position and speed signals 24, 26 and a torque command signal 28 are applied to the controller 18. The torque command signal 28 is indicative of the desired motor torque. The controller 18 determines a voltage amplitude 30 required to develop the desired torque by using the position, speed and torque command signals 24, 26, 28 and other fixed motor parameter values in the control equation 12. For a three-phase motor, three sinusoidal reference signals that are synchronized with the motor back-emf are required to generate the required motor input voltages. The controller transforms the voltage amplitude signal 30 into three phase signals by determining phase voltage command signals $V_a$, $V_b$ and $V_c$ from the voltage amplitude signal 30 and the position signal 24 according to the following equations:

$$V_a = V_{amp}\sin(\theta) \quad (10)$$

$$V_b = V_{amp}\sin(\theta - 120°) \quad (11)$$

$$V_c = V_{amp}\sin(\theta < 240°) \quad (12)$$

Motor voltage command signals 32 of the controller 18 are applied to a power inverter 23 that is coupled with a power source 22 to apply phase voltages 34 to the stator windings of the motor in response to the motor voltage command signals 32. But in order to generate phase voltages 34 with an average sinusoidal shape, switching devices (not shown) of the inverter 23 must be turned on and off for specific durations at specific rotor angular positions. Control of the inverter 23 can be implemented according to any appropriate pulse width modulation (PWM) scheme.

Figure 4:
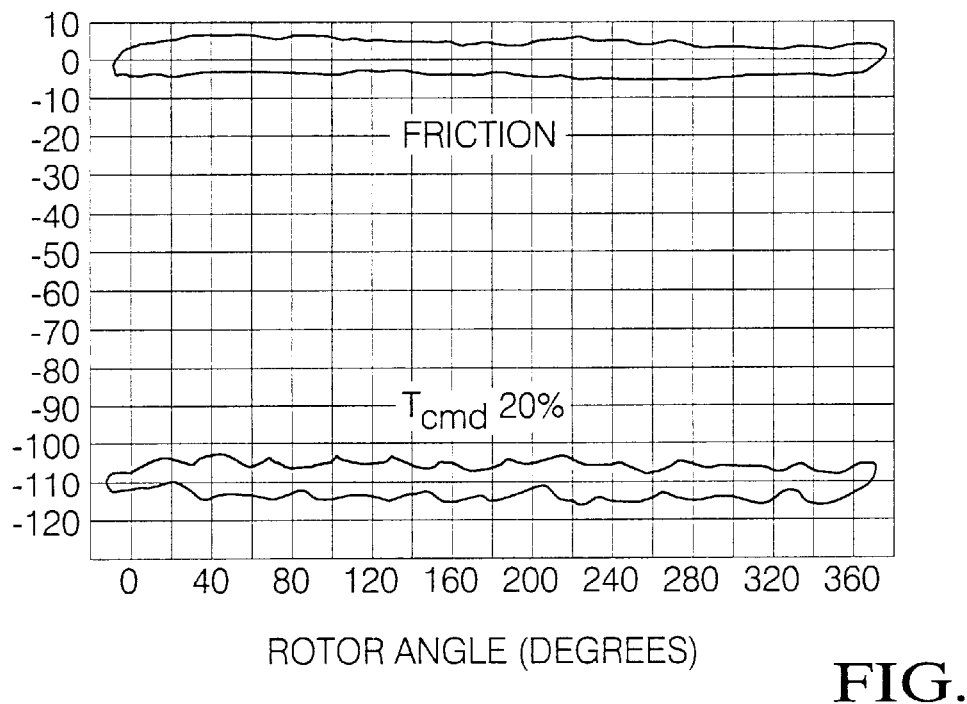
FIG. 4 is a graph of torque vs. rotor angle for a motor controlled by a voltage mode control method at 20% torque command.
Figure 5:
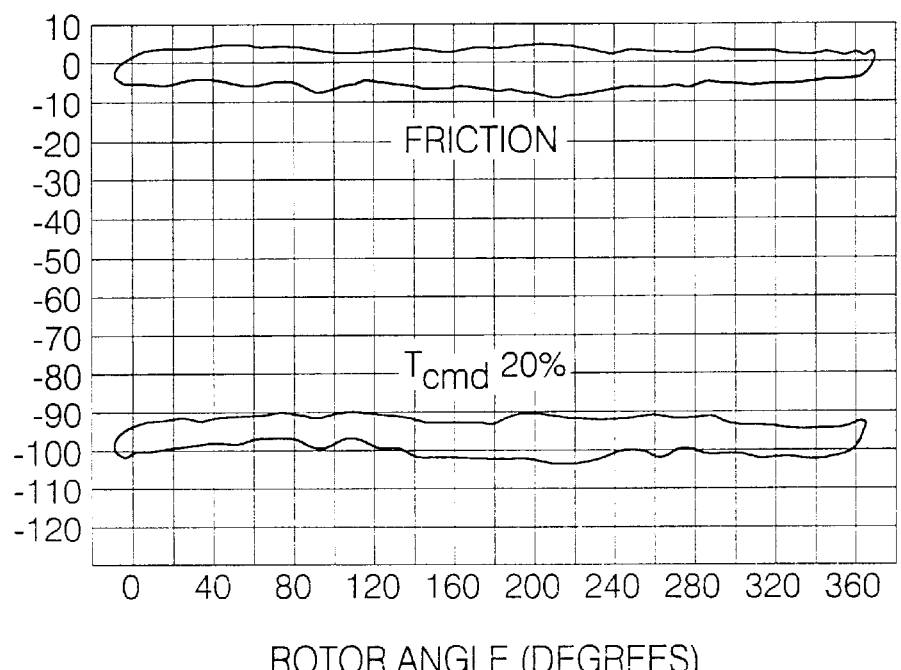
FIG. 5 is a graph of torque vs. rotor angle for a motor controlled by a current mode control method at 20% torque command.

By using this voltage mode control method, the low frequency torque ripple is reduced. FIG. 4 shows the results of a test performed to measure the torque ripple performance of the voltage control method of the invention. The test was performed on a rotor of a PM motor that was locked and the rotor angle varied slowly. The test can be thereby considered to be conducted at zero speed. FIG. 4 shows that there is still some torque ripple in the voltage mode. But the characteristic of torque ripple is different from that of the current mode that is shown in FIG. 5. Unlike the current mode, the frequency of the torque ripple is at the motor commutation frequency which is six times the fundamental frequency. Also, there are no fundamental or 2nd harmonic components seen in FIG. 4. The fact that the torque ripple frequency is six times higher than the current mode allows the voltage mode control method to provide a smoother torque as the higher frequency component is easily filtered out by the system inertia.

The voltage mode control method is not expected to provide the same precise torque control as the current mode. This is because the voltage mode control is a feed-forward control, instead of a closed-loop regulation, and changes in the motor parameters can directly influence the output level. Therefore, it should be applied to only those applications where precise torque level control is not critical.

Figure 6:
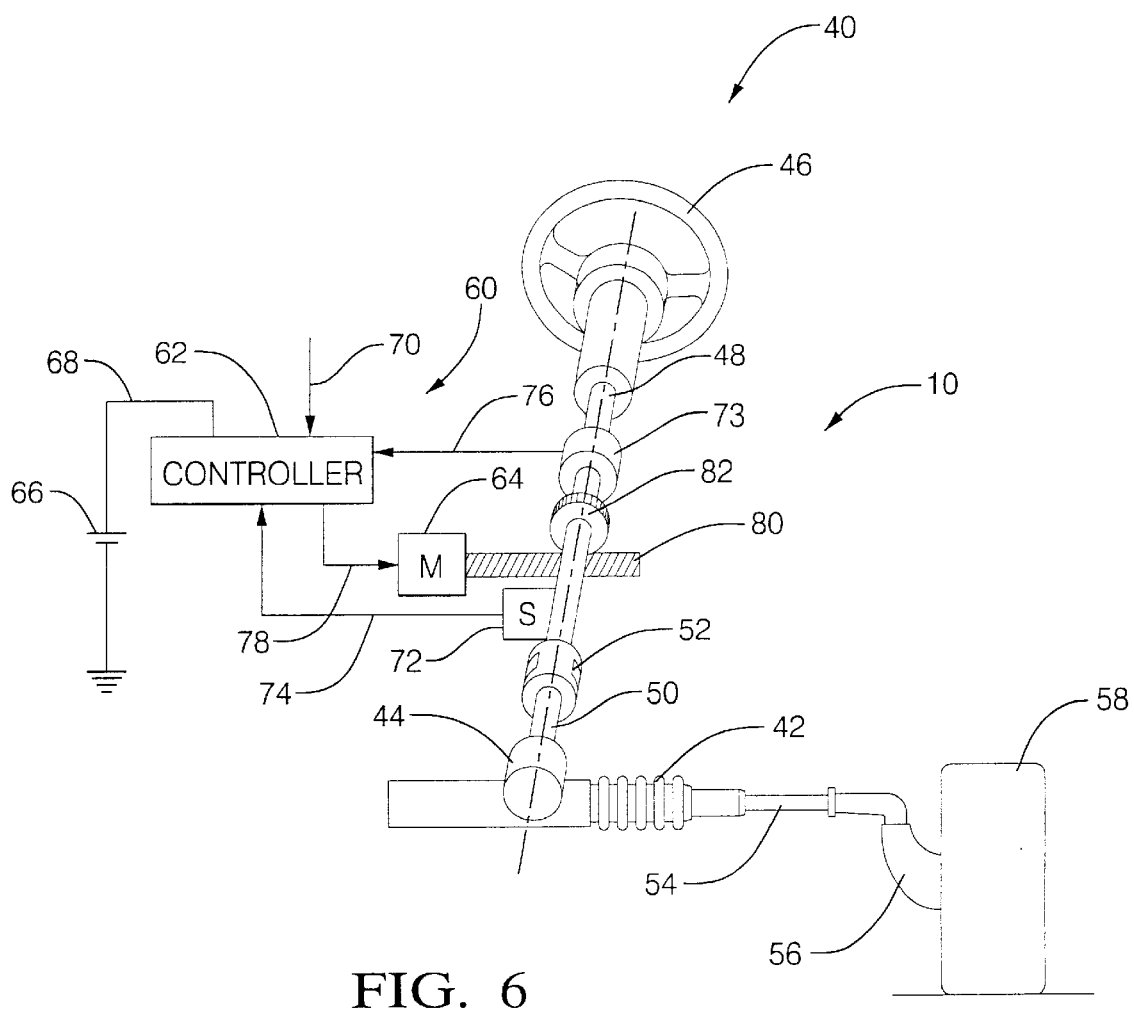
FIG. 6 illustrates a schematic diagram of an electric power steering system.

One such application is in an electrical power steering system. Referring now to FIG. 6, reference numeral 40 generally designates a motor vehicle power steering system suitable for implementation of this invention. The steering mechanism 42 is a rack-and-pinion type system and includes a toothed rack (not shown) and a pinion gear (also not shown) located under gear housing 44. As the steering wheel 46 is turned, the upper steering shaft 48, connected to the lower steering shaft 50 through universal joint 52, turns the pinion gear. Rotation of the pinion gear moves the toothed rack which moves tie rods 54 (only one is shown) that in turn move the steering knuckles 56 (only one is shown), which turn wheels 58 (only one is shown).

Electric power steering assist is provided through the unit generally designated by reference numeral 60 and includes a controller 62 and the electric motor 64. The controller 62 is powered by a vehicle power supply 66 through line 68. The controller 62 receives a signal representative of the vehicle velocity on line 70. Steering pinion gear angle is measured through position sensor 72, which may be an optical encoding type sensor, variable resistance type sensor, or any other suitable type of position sensor, and fed to the controller 62 through line 74.

As the steering wheel 46 is turned, torque sensor 73 senses the torque applied to the steering wheel 46 by the vehicle operator. The torque sensor 73 may include a torsion bar (not shown) and a variable resistive-type sensor (also not shown) which outputs a variable resistance signal to controller 62 through line 76 in relation to the amount of twist on the torsion bar. Although this is the preferable torque sensor, any other suitable torque-sensing device used with known signal processing techniques will In response to the inputs on lines 70, 74, and 76, the controller 62 sends a current command or a voltage command through line 78 to the electric motor 64. The motor 64 in turn supplies torque assist to the steering system through a worm 80 and a worm gear 82, in such a way as to providing a torque assist to the vehicle steering in addition to a driving force exerted by the vehicle operator.

Figure 7:
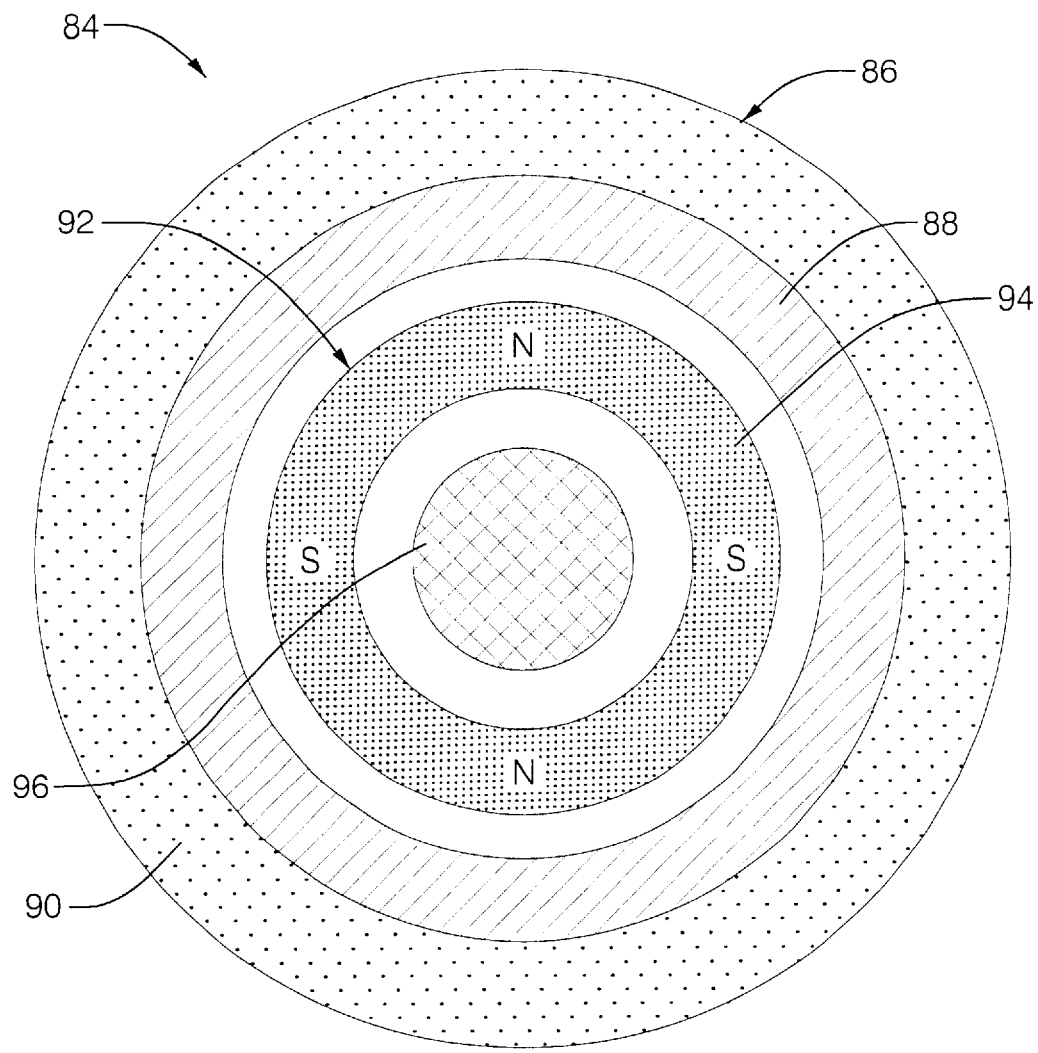
FIG. 7 illustrates a schematic of an embodiment of a TRF motor cross section.

One preferred type of sinusoidal torque ripple free (TRF) motor may contain several new elements and materials that have not been combined together in one motor in the past. FIG. 7 illustrates a cross section of the sinusoidal TRF motor which is generally designated by the numeral 84. The sinusoidal TRF motor 84 includes a new stator 86 with (a) air gap (slotless) winding 88, (b) composite iron yoke 90, also acting as a housing; (c) a rotor 92 with a high energy magnet 94 that is sinusoidally magnetized, (d) a molded composite plastic shaft 96; (e) a high resolution position sensor (not shown) with magnetic resistor (MR) sensing elements and (f) steel wheels (also not shown). Such motors are described in greater detail in commonly assigned U.S. application Ser. No. 09/656,116, entitled TORQUE RIPPLE FREE ELECTRIC POWER STEERING, filed Sep. 6, 2000, the disclosure of which is incorporated by reference herein in its entirety.

In order to generate motor currents with a sinusoidal shape, the inverter switching devices (e.g., MOSFETS) must be turned on and off at specific rotor angular positions. Therefore, the position of the rotor must be known at all times and an encoder is needed. This requirement is one of the factors adding to the cost of sinusoidal drives, hence traditionally limiting their application to high-performance applications. EPS is a high-performance drive, however it must meet stringent cost limits. Therefore, a new type of encoder is desirable such that it combines high resolution and low cost.

The two most popular ways to sense rotary position are based on optical detection and magnetic field variation. Optical encoders are temperature limited and susceptible to dirt. Semiconductor-based magnetic sensors (magnetoresistors, or MRs), on the other hand, can work at higher temperature, and are starting to be used in automotive applications.

As stated earlier, the angle δ has to be chosen properly. The choice of δ that results in minimal saturation or demagnetization effects on the permanent magnet field is preferred. In addition, at high angular speed, the effect of power angle α can no longer be ignored. At low angular speed α is zero from zero speed until the base speed, so there is no need to compute it. For speed beyond the base speed, α can be approximated as only a function of the speed. Note that when α is in the beyond base speed range, it is in the field weakening range. It can be appreciated that because the invention is related to voltage control, it necessarily means that there is no sensor to sense the power angle α. Furthermore, choices of δ that are related to α needs to be determined.

In the "voltage mode" of operation, where the machine is controlled without phase current sensors, mainly for lower cost, phase advance has not been an option because phase currents are not directly controlled or measured. The method and apparatus described here accomplish similar result as in current mode control but without using phase current sensors. Instead, the controller (microprocessor) is used to compute the phasor diagram at the optimum current and only control the voltage vector directly.

A preferred embodiment uses pre-computed two-dimensional tables for different torque values at different speeds and DC supply currents. The optimal current phase advance angle is looked up, based on the torque command, which is then used to compute voltage command and its appropriate angle. The look-up tables of the sinusoidal function is then used to output the command voltage and its direction angle.

Figure 8:
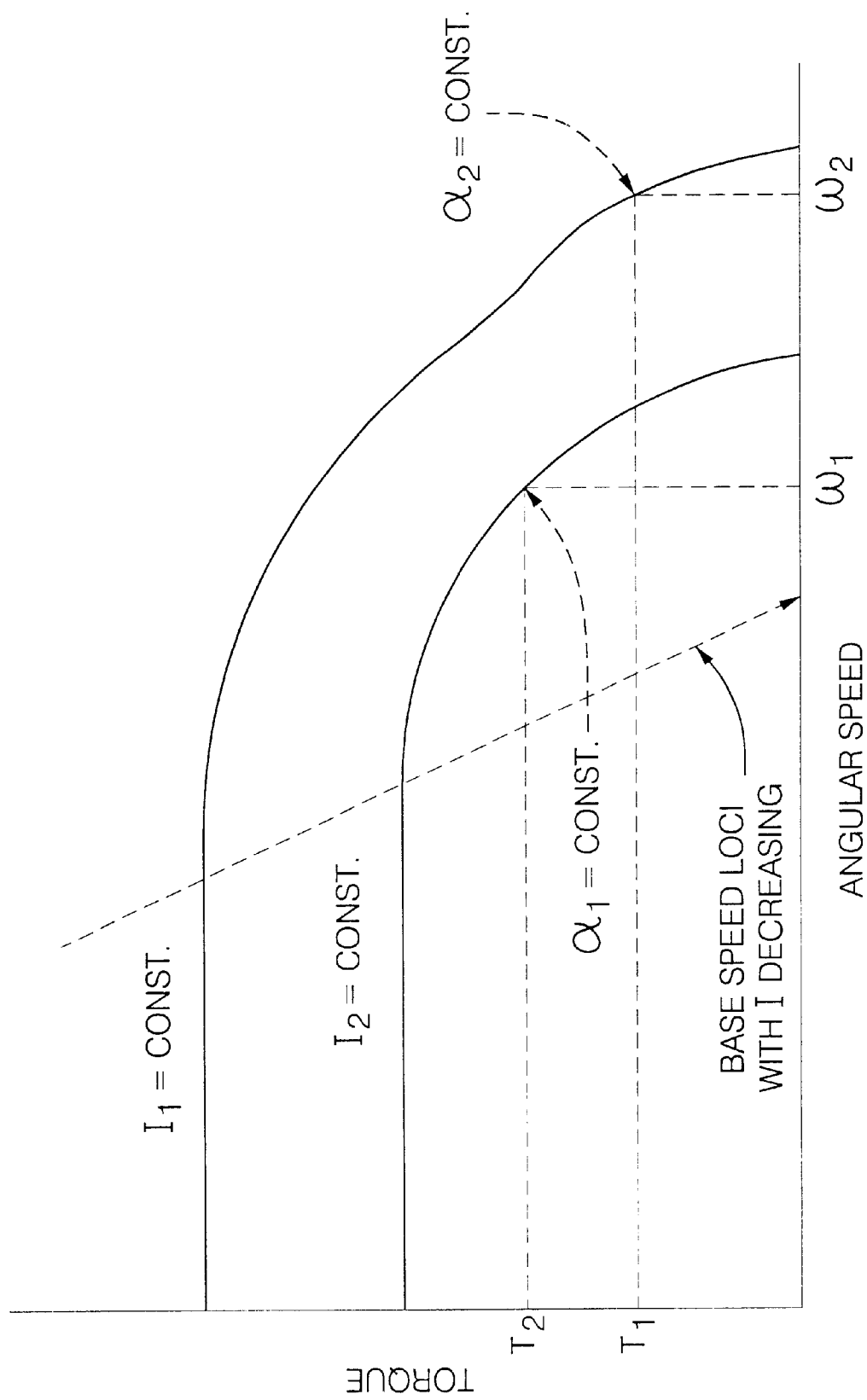
FIG. 8 shows a graph explaining how to compute the values and parameters used to build the look-up tables.

Referring to FIG. 8, a graph explaining how to compute the values and parameters used to build the look-up tables is shown. The functional relationship between angular speed and torque is depicted. The upper line describes the functional relationship between angular speed and torque when phase current equals constant $I_1$. The lower line describes the functional relationship between angular speed and torque when phase current equals constant $I_2$, with $I_1 > I_2$.

A power equation, neglecting iron and mechanical losses, is described as follows:

$$T\omega_m = 3EI\cos(\alpha) \tag{13}$$

where
T is the output torque,
E is phase rms (root mean square) back-emf,
I is phase rms (root mean square) current, and
α is the power angle between I and E.
From equation 19, we get:

$$I\cos\alpha = \frac{T\omega_m}{3E} \tag{14}$$

further, $$E = K_E\omega_e \text{ and,} \tag{15}$$

$$\omega_e = N_p\omega_m \tag{16}$$

$$\therefore I\cos\alpha = \frac{T}{3N_p K_E} \tag{17}$$

where $N_p$ is the number of pole pairs of the electric machine.
In addition, if we set the T to commanded torque, $T_{cmd}$, then $$I\cos\alpha = \text{Constant,} \tag{18}$$

at any speed and torque.

Note that starting from zero speed, $I_1$ and $I_2$ initially stay horizontal straight line segments. In other words, the torque is constant in relation to angular speed for the horizontal straight line segment. At the end of the horizontal straight line segment, when the back-emf equals the supply voltage, torque starts to decrease as the angular speed increases. A line can be drawn tracing a set of end points of the above horizontal straight-line segment. The line is defined as a set of base speed loci.

Furthermore, upon inspection of FIG. 8 and the above analysis, it will be seen that maximizing $\cos(\alpha)$ guarantees the optimal (in this case minimum) current for a certain speed and torque. For example, $\omega_1$ and $T_1$ the minimum current is $I_1$ and the minimum power angle is $\alpha_1$ while at $\omega_2$ and $T_2$, the minimum current, $I_2$, is achieved at the power angle $\alpha_2$. By storing these pre-computed values as a set of 2-D tables with speed as an independent variable and torque at each angle ($\alpha$) as a dependent variable. In that table where the angle $\alpha$ changes between a minimum value and a maximum value in steps for each table. One can look-up the smallest or closest cc that satisfies the required torque at the given speed. Note that the above analysis applies to a region of torque-speed characteristics to the right of the base speed locus in FIG. 8.

Figure 9:
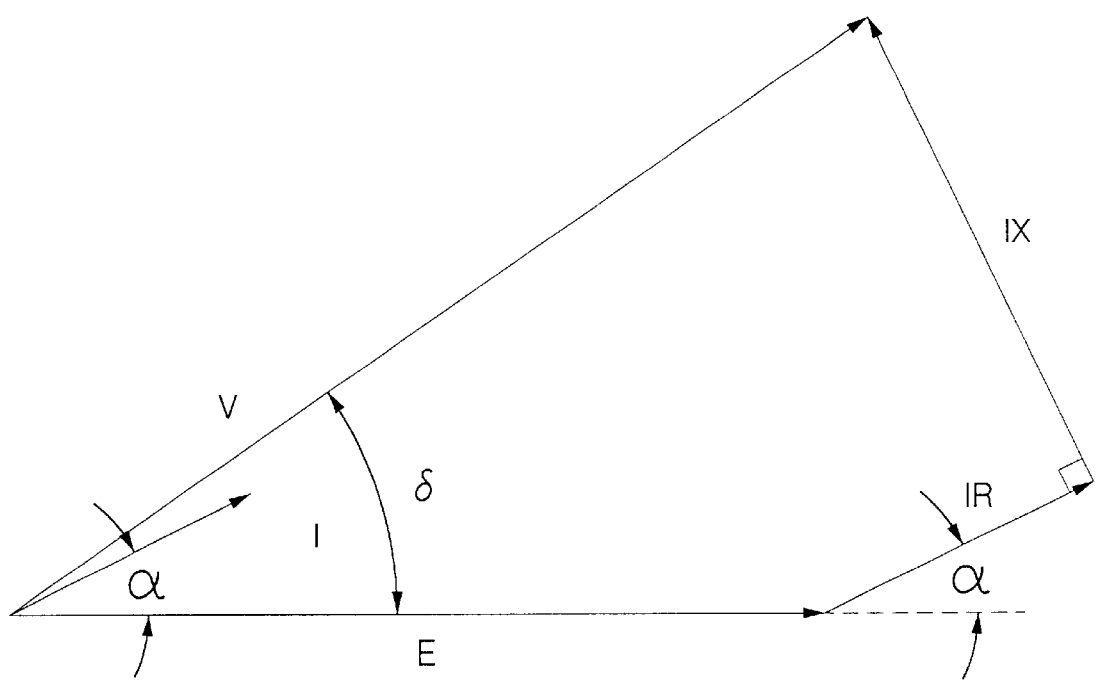
FIG. 9 is a phasor diagram used to calculate the command phase voltages from the voltage vector.

Referring to FIG. 9, a phasor diagram used to calculate the command phase voltages from the voltage vector is shown. I is phase current in amperes (A), R is phase resistance in ohms ($\Omega$), X is phase reactance in ohms ($\Omega$), E is back-emf in volts (V), and V is phase voltage in volts (V). The power angle a is defined as the angle between the phasor of E and the phasor of I, and $\delta$ is defined as the angle between the phasor of V and the phasor of E. The related equations used to calculate the command phase voltages from the voltage vector is described as follows.

The following is a set phase voltage $$V_a = V_{ph,p} \sin(\delta + \theta_e) \quad (19)$$

$$V_b = V_{ph,p} \sin(120 + \delta + \theta_e) \quad (20)$$

$$V_c = V_{ph,p} \sin(\delta - 120 + \theta_e) \quad (21)$$

where
$\theta_e = \theta_m N_p$
$\theta_e$ denotes rotor position (electrical)
$\theta_m$ denotes rotor position (mechanical)

$$V_{ph,p} = \sqrt{2}\, V_{ph,rms}$$

and subscripts a, b, c refer to phases A, B, and C.

When $\alpha$ is determined, for example looking $\alpha$ up from a table, a magnitude of V is to be determined as follows:

$$V_{ph,rms} = \sqrt{E_{ph,rms}^2 + I_{ph,rms}^2(R_{ph}^2 + X_{ph}^2) + 2E_{ph,rms}I_{ph,rms}(R_{ph}\cos(\alpha) - X_{ph}\sin(\alpha))} \quad (22)$$

When $V_{ph,rms}$ is known, $\delta$ can be computed as follows:

$$\delta = \sin^{-1}\left[\frac{I_{ph,rms}R_{ph}\sin(\alpha) + I_{ph,rms}X_{ph}\cos(\alpha)}{V_{ph,rms}}\right] \quad (23)$$

Therefore, it can be appreciated that after looking up a value of $\alpha$, equation (22) and (23) are used, to compute the magnitude of V (22) and its angle $\delta$ (see Eq. 23), which are then used in equations (19–21) for computing the voltage command for each phase.

Note that phase advance in voltage mode are sensitive to supply (battery) voltage, as well as winding and magnet temperature.

In regard to sensitivity to supply voltage, the base speed loci can be moved right/left by increasing/decreasing a supply voltage, which can be measured. Thus, an estimate of the available motor phase voltage can be made not to exceed a desired value such that when commanding the required motor terminal voltage, the motor operation will not be interrupted. In a motor design stage, the minimum and maximum voltage required for developing required torque values at specific speeds can be computed and checked versus minimum and maximum supply voltages in order to avoid undesirable problems.

With regard to sensitivity to temperature, it is known that temperature affects both the magnetic field, because of magnet sensitivity, and the winding resistance. Both are used in the above equations to compute the motor voltage and its angle. For the winding resistance sensitivity, the best approach is to use an estimated/measured resistance or use the temperature coefficient to modify the resistance values used (in case temperature is available), such as by using the equation:

$$R = R_r(1 + \alpha \Delta T) \quad (24)$$

where
R is an actual resistance,
$R_r$ is the resistance at room temperature,
$\Delta T$ is the temperature difference between the temperature of interest and room temperature, and
$\alpha$ is the temperature resistivity coefficient.

In regard to the magnet temperature, it can be estimated from the winding temperature and used to modify the back-emf constant of the machine.

Attention is drawn to the fact that current control with phase advance is used in electric machines in order to achieve an extended speed range of operation at reduced phase current. The extended speed range of operation is achieved by controlling the angle "$\alpha$" between the current vector and the back-emf vector, as well as through some degree of field weakening. Angle $\alpha$ is known as the "power angle" because it affects the resultant electromechanical power. In this case of phase advance, the phase currents parameters need to be known, and generally speaking, current sensors must be used. It follows that one of the benefits of phase advance, or power angle control, is a reduction of power rating of a power circuit such as an inverter. As a consequence, because of the lower phase current, the cost of power circuit such as the inverter cost is lowered. The above method of controlling electric machine currents, based on torque and speed commands as well as phase current measurements, is known as the "current mode" of operation.

In a "voltage mode" of operation where the machine is controlled without phase current sensors, mainly to reduce cost, phase advance has not been an option. This is true because phase currents are not directly measured or controlled. The method described here accomplished the same result as in current mode control but without using phase current sensors. Instead, a controller (microprocessor) software is used to compute the phasor diagram (see FIG. 9) at the optimum current. The voltage vector is the vector that is controlled directly.

In the preferred embodiment, a set of pre-computed two-dimensional tables stores different torque values at different speeds and phase currents. The optimal current phase advance angle is looked up, based on the torque command and sensed speed, which is then used to compute voltage command and its appropriate angle. The look-up tables of the sinusoidal function are used to output the command voltage amplitude and its direction angle. Note that the following method can achieve the intended purpose of the invention:

1. Construct a 2-D look-up table for maximum available torque "$T_{max}$" and mechanical speed "$\omega_m$" in relation to a set of maximum phase rms currents "$\max(I_{ph,rms})$", because for a given motor/inverter design, maximum rms phase current (or a root mean square value of the phase current) "$\max(I_{ph,rms})$", as well as motor torque-speed characteristics are known.

2. Read the speed "$\omega_m$" and the command (required) torque "$T_{cmd}$" and clip or reduce it, if "$T_{cmd}$" is greater than the maximum available torque "$T_{max}$" at that speed "$\omega_m$".

3. Compute the required phase current $I_{ph,rms}$ from the following equation, based upon the commanded torque $T_{cmd}$:

$$I_{ph,rms} = \frac{T_{cmd}}{T_{max}} I_{ph,rms|max}$$

4. Compute the power angle $\alpha$, which is defined as the angle between the current phasor (vector) and the back-emf phasor (vector), by means of looking up from an arc cosine table using the following equation:

$$\alpha = \cos-1\left[\frac{T_{cmd}}{3N_p K_e I_{ph,rms}}\right]$$

where,
$N_p$ denotes the number of pole pairs,
$K_e$ denote back-emf constant of the electric machine, rms value,
$E_{ph,rms} = K_e \omega_m$,
$\omega_m$ is machine mechanical speed, in rad/s,
$E_{ph,rms}$ is phase rms back-emf.

5. Compute phase rms voltage $V_{ph,rms}$ by way of the following equation (22), which is derived from the phasor diagram of FIG. 9:

$$V_{ph,rms} = \sqrt{E_{ph,rms}^2 + I_{ph,rms}^2(R_{ph}^2 + X_{ph}^2) + 2E_{ph,rms}I_{ph,rms}(R_{ph}\cos(\alpha) - X_{ph}\sin(\alpha))}$$

where,
$X_{ph} = N_p \omega_m L_{ph}$
$L_{ph}$ denotes phase inductance, an electric machine parameter.

6. Compute the angle of phasor $V_{ph,rms}$ with respect to the back-emf vector $E_{ph,rms}$ denoted by $\delta$ by the following equation (23)

$$\delta = \sin^{-1}\left[\frac{I_{ph,rms}R_{ph}\sin(\alpha) + I_{ph,rms}X_{ph}\cos(\alpha)}{V_{ph,rms}}\right]$$

7. Output command voltage for each phase as:

$$V_a = V_{ph,p}\sin(\delta + \theta_e)$$

$$V_b = V_{ph,p}\sin(120 + \delta + \theta_e)$$

$$V_c = V_{ph,p}\sin(\delta - 120 + \theta_e)$$

where,
$\theta_e = \theta_m N_p$
$\theta_e$ denotes rotor position (electrical)
$\theta_m$ denotes rotor position (mechanical)

$$V_{ph,p} = \sqrt{2}\, V_{ph,rms}$$

Notice that 2-D look-up tables may replace some or all of the above computations, for example:

In equation (4), look up the power angle $\alpha$ from an arc cosine table

In equation (5), compute $V^2$ and then look up the square root $V_{ph,rms}$.

One sine table can be used to look up the sin of the angle needed for equation (7) as well as the angle 6 in equation (6) after exchanging the input and output.

Furthermore, there are some simplification that could be implemented in this scheme to reduce both the number of computations as well as the memory requirement. For example in equation (4) $\alpha$ is zero from zero speed until the base speed, so there is no need to compute it. Then beyond the base speed, in the field weakening range, It can be approximated as only a function of the speed. That eliminates the need for computing the inverse cosine argument.

In addition, field weakening algorithms like this one that are based on computations, using machine parameters, can suffer from variations due to temperature. Winding temperature, for example, increases with increasing loads and time. Thus increasing phase resistance that is used to compute the required voltage command. Another factor is the supply voltage that changes the base speed of the machine. These sensitivities to both temperature and supply voltage are common to all voltage mode schemes in general, including even simple ones without field weakening, that are based on phasor diagram calculations. The variations in resultant torque due to varying temperature and supply voltage will only affect the precision of the assist torque that will be different than the computed torque by a small percentage.

Figure 10:
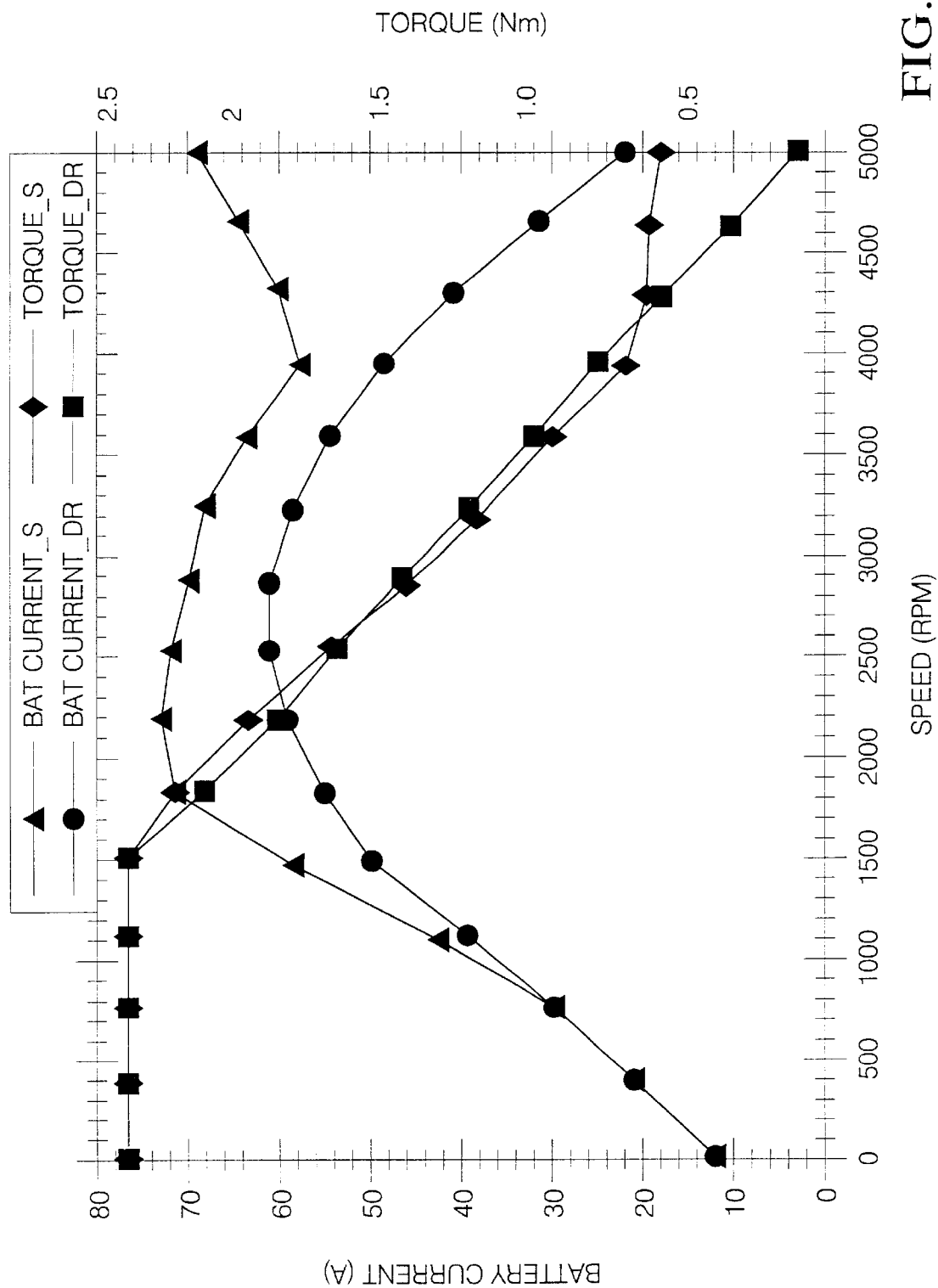
FIGS. 10 and 11 depict simulation.
Figure 11:
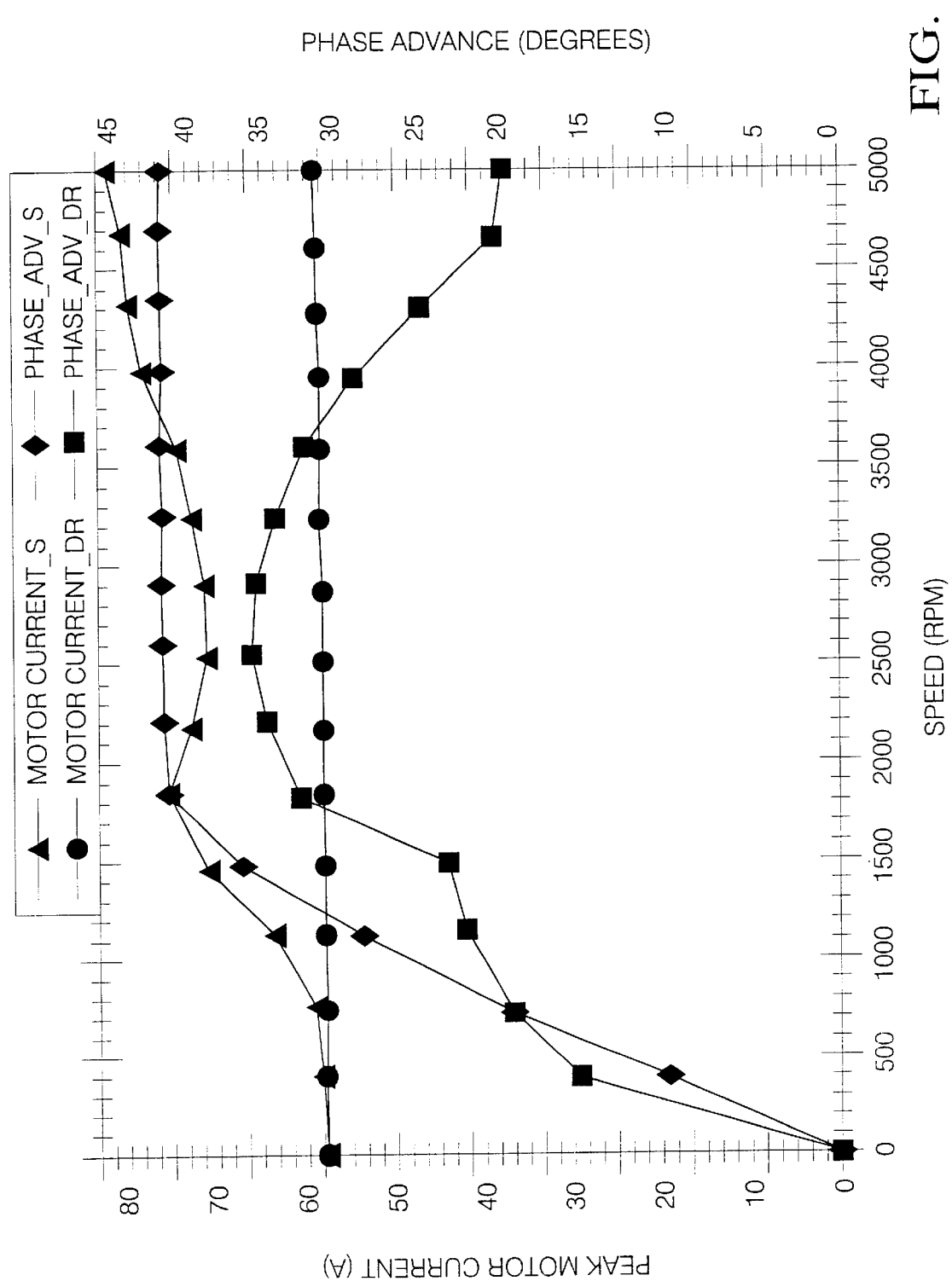

Referring to FIGS. 10 and 11, some simulation results are depicted in order to show the benefits of using the invention for low cost and simple, yet effective, approach to extending the speed range of a brushless PM machines while reducing the phase current required. The basis for the low cost stems from the fact that the inverter 23 does not need phase current sensors. The invention is simple in that the method of this invention requires few computations. FIGS. 10 and 11 show that the invention has better results as compared to other methods in that it produces same required torque results while at the same time using lower phase and DC currents. In the FIGS. 10 and 11, the extension "S" denotes one of the other methods, and "DR" denotes the results of the invention. Upon inspection of FIGS. 10 and 11, the invention produces the same torque using less battery current and motor current than the other method. As can be appreciated, it is beneficial to have lower motor current, which means that the inverter rating is lower. In addition, the machine efficiency is improved at speeds beyond the base speed for the invention because the requisite battery power is less.

The invention can be embodied in the form of computer-implemented processes and apparatuses for practicing those processes. The invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A voltage mode control method for extending speed range operation from a sinusoidally excited permanent magnet motor, comprising:

determining a known maximum allowed value from a first set of parameters with each parameter having said known maximum value;

reading a second set of parameters;

computing a first derived angle using said first set of parameters and said second set of parameters;

computing amplitude and a second derived angle of phase voltage vector using said first derived angle and a third set of parameters; and outputting a set of derived command voltages for controlling a power circuit whereby the said power circuit can achieve required torque levels with lower currents for power switches.

2. The voltage mode control method of claim 1 wherein said first set of parameters comprises:

a set of tabled available torque having a maximum torque; and a set of tabled mechanical speed having a maximum mechanical speed, whereby both said set of tabled available torque and said set of tabled mechanical speed are derived from a set of maximum allowed phase rms currents.

3. The voltage mode control method of claim 1 wherein said second set of parameters comprises:

a requisite torque; and a sensed speed derived from a rotor of said sinusoidally excited permanent magnet motor.

4. The voltage mode control method of claim 3 further comprising:

determining whether said requisite torque is greater than said maximum torque; and if said requisite torque is greater than said maximum torque, setting said requisite torque as said maximum torque.

5. The voltage mode control method of claim 1 further comprising computing a requisite phase current.

6. The voltage mode control method of claim 1 wherein: said reading of said second set of parameters comprises:

reading a speed value; and reading a requisite torque value.

7. The voltage mode control method of claim 1 wherein said first derived angle is computed by:

$$\alpha = \cos-1\left[\frac{T_{cmd}}{3N_p K_e I_{ph,rms}}\right]$$

where, $\alpha$=first derived angle, $N_p$ denotes the number of pole pairs, $K_e$ denote back-emf constant of the electric machine, rms value, $E_{ph,rms}=K_e\omega_m$, $\omega_m$ is machine mechanical speed, in rad/s, $E_{ph,rms}$ is phase rms back-emf.

8. The voltage mode control method of claim 1 further comprising:

computing a phase rms voltage given by:

$$V_{ph,rms} = \sqrt{E_{ph,rms}^2 + I_{ph,rms}^2(R_{ph}^2 + X_{ph}^2) + 2E_{ph,rms}I_{ph,rms}(R_{ph}\cos(\alpha) - X_{ph}\sin(\alpha))}.$$

9. The voltage mode control method of claim 1 wherein: said second derived angle is computed by:
where, $$\delta = \sin^{-1}\left[\frac{I_{ph,rms}R_{ph}\sin(\alpha) + I_{ph,rms}X_{ph}\cos(\alpha)}{V_{ph,rms}}\right]$$

$\alpha$ = first derived angle

10. The voltage mode control method of claim 1 wherein said set of derived command voltages comprises:

$V_a$ $V_b$ and $V_c$ with $V_a$ $V_b$ and $V_c$ denoted by:

$$V_a = V_{ph,p} \sin(\delta+\theta_e)$$

$$V_b = V_{ph,p} \sin(120 +\delta+\theta_e)$$

$$V_c = V_{ph,p} \sin(\delta-120+\theta_e)$$

where, $\theta_e = \theta_m N_p$ $\theta_e$ denotes rotor position (electrical)

$\theta_m$ denotes rotor position (mechanical) and $$V_{ph,p} = \sqrt{2}V_{ph,rms}.$$

11. The voltage mode control method of claim 1 wherein said power circuit comprises an inverter.

12. The voltage mode control method of claim 1 wherein said third set of parameters comprises rms phase current, rms voltage, phase impedance, and phase resistance.

13. The voltage mode control method of claim 12 wherein said phase resistance is compensated for temperature variations by a method comprising:

measuring the temperature of the phase windings; and calculating the actual phase resistance by using the equation:

$$R = R_r(1 + \alpha \Delta T)$$

where R is the actual phase resistance, $R_r$ is said phase resistance at room temperature, $\alpha$ is a temperature sensitivity coefficient, and $\Delta T$ is the difference between said measured temperature and room temperature.

14. A power steering assist system comprising:

a steering wheel and column;

an electric motor comprising a motor controller, said electric motor adapted to impart rotational force to said steering column;

a power steering controller adapted to control said electric motor in a manner effective in providing power steering assist to an operator of said steering wheel; and wherein said electric motor controller operates by the method of claim 1.

15. A voltage mode control method for reducing torque ripple in an electric motor, comprising:

providing a sinusoidally excited permanent magnet motor without current sensors;

determining a known maximum allowed value from a first set of parameters with each parameter having said known maximum value;

reading a second set of parameters;

computing a first derived angle using said first set of parameters and said second set of parameters;

computing amplitude and a second derived angle of phase voltage vector using said first derived angle and a third set of parameters; and outputting a set of derived command voltages for controlling a power circuit whereby the said power circuit can achieve required torque levels with lower currents for power switches.

16. A storage medium encoded with machine-readable computer program code for extending speed range operation from a sinusoidally excited permanent magnet motor, said storage medium including instructions for causing a computer to implement a method comprising:

determining a known maximum allowed value from a first set of parameters with each parameter having said known maximum value;

reading a second set of parameters;

computing a first derived angle using said first set of parameters and said second set of parameters;

computing amplitude and a second derived angle of phase voltage vector using said first derived angle and a third set of parameters; and outputting a set of derived command voltages for controlling a power circuit whereby the said power circuit can achieve required torque levels with lower currents for power switches.

17. The storage medium of claim 16 wherein said first set of parameters comprises:

a set of tabled available torque having a maximum torque; and a set of tabled mechanical speed having a maximum mechanical speed, whereby both said set of tabled available torque and said set of tabled available mechanical speed are derived from a set of maximum allowed phase rms currents.

18. The storage medium of claim 16 wherein said second set of parameters comprises:

a requisite torque; and a sensed speed derived from a rotor of said sinusoidally excited permanent magnet motor.

19. The storage medium of claim 18 further comprising instructions for causing a computer to implement the procedure of:

determining whether said requisite torque is greater than said maximum torque; and if said requisite torque is greater than said maximum torque, setting said requisite torque as said maximum torque.

20. The storage medium of claim 16 further comprising instructions for causing a computer to implement the procedure of:

computing a requisite phase current.

21. The storage medium of claim 16 wherein said reading of said second set of parameters comprises:

reading a speed value; and reading a requisite torque value.

22. The storage medium of claim 16 wherein said first derived angle is computed by:

$$\alpha = \cos^{-1}\left[\frac{T_{cmd}}{3N_p K_e I_{ph,rms}}\right]$$

where, $\alpha$ = first derived angle, $N_p$ denotes the number of pole pairs, $K_e$ denote back-emf constant of the electric machine, rms value, $E_{ph,rms} = K_e \omega_m$, $\omega_m$ is machine mechanical speed, in rad/s, $E_{ph,rms}$ is phase rms back-emf.

23. The storage medium of claim 16 further comprising instructions for causing a computer to implement the procedure of:

computing a phase rms voltage given by:

$$V_{ph,rms} = \sqrt{E_{ph,rms}^2 + I_{ph,rms}^2(R_{ph}^2 + X_{ph}^2) + 2E_{ph,rms}I_{ph,rms}(R_{ph}\cos(\alpha) - X_{ph}\sin(\alpha))}.$$

24. The storage medium of claim 16 wherein said second derived angle is computed by:

$$\delta = \sin^{-1}\left[\frac{I_{ph,rms}R_{ph}\sin(\alpha) + I_{ph,rms}X_{ph}\cos(\alpha)}{V_{ph,rms}}\right]$$

where, $\alpha$ = first derived angle.

25. The storage medium of claim 16 wherein said set of derived command voltages comprising:

$V_a$, $V_b$ and $V_c$ with $V_a$, $V_b$ and $V_c$ denoted by:

$$V_a = V_{ph,p}\sin(\delta + \theta_e)$$

$$V_b = V_{ph,p}\sin(120 + \delta + \theta_e)$$

$$V_c = V_{ph,p}\sin(\delta - 120 + \theta_e)$$

where, $\theta_e = \theta_m N_p$ $\theta_e$ denotes rotor position (electrical)

$\theta_m$ denotes rotor position (mechanical) and $$V_{ph,p} = \sqrt{2} V_{ph,rms}.$$

26. The storage medium of claim 16 wherein said power circuit comprises an inverter.

27. The storage medium of claim 16 wherein said third set of parameters comprises rms phase current, rms voltage, phase impedance, and phase resistance.

28. The storage medium of claim 27 wherein said phase resistance is compensated for temperature variations by a method comprising:

measuring the temperature of the phase windings; and calculating the actual phase resistance by using the equation:

$$R = R_r(1 + \alpha \Delta T)$$

where R is the actual phase resistance, $R_r$ is said phase resistance at room temperature, $\alpha$ is a temperature sensitivity coefficient, and $\Delta T$ is the difference between said measured temperature and room temperature.

29. A power steering assist system comprising:

a steering wheel and column;

an electric motor comprising a motor controller having a storage medium, said electric motor adapted to impart rotational force to said steering column;

a power steering controller adapted to control said electric motor in a manner effective in providing power steering assist to an operator of said steering wheel; and wherein said storage medium operates said electric motor controller by the method of claim 16.

30. A method of reducing torque ripple in an electric motor, comprising:

providing a sinusoidally excited permanent magnet electric motor without current sensors;

providing a controller for controller said electric motor; said controller having a storage medium encoded with machine-readable computer program code, said code comprising instructions for causing a computer to implement a procedure comprising:

determining a known maximum allowed value from a first set of parameters with each parameter having said known maximum value;

reading a second set of parameters;

computing a first derived angle using said first set of parameters and said second set of parameters;

computing amplitude and a second derived angle of phase voltage vector using said first derived angle and a third set of parameters; and outputting a set of derived command voltages for controlling a power circuit whereby the said power circuit can achieve required torque levels with lower currents for power switches.

\* \* \* \* \*